(No Model.)  3 Sheets—Sheet 1.
A. J. HUBER.
PORTABLE SAW MILL.
No. 309,056. Patented Dec. 9, 1884.
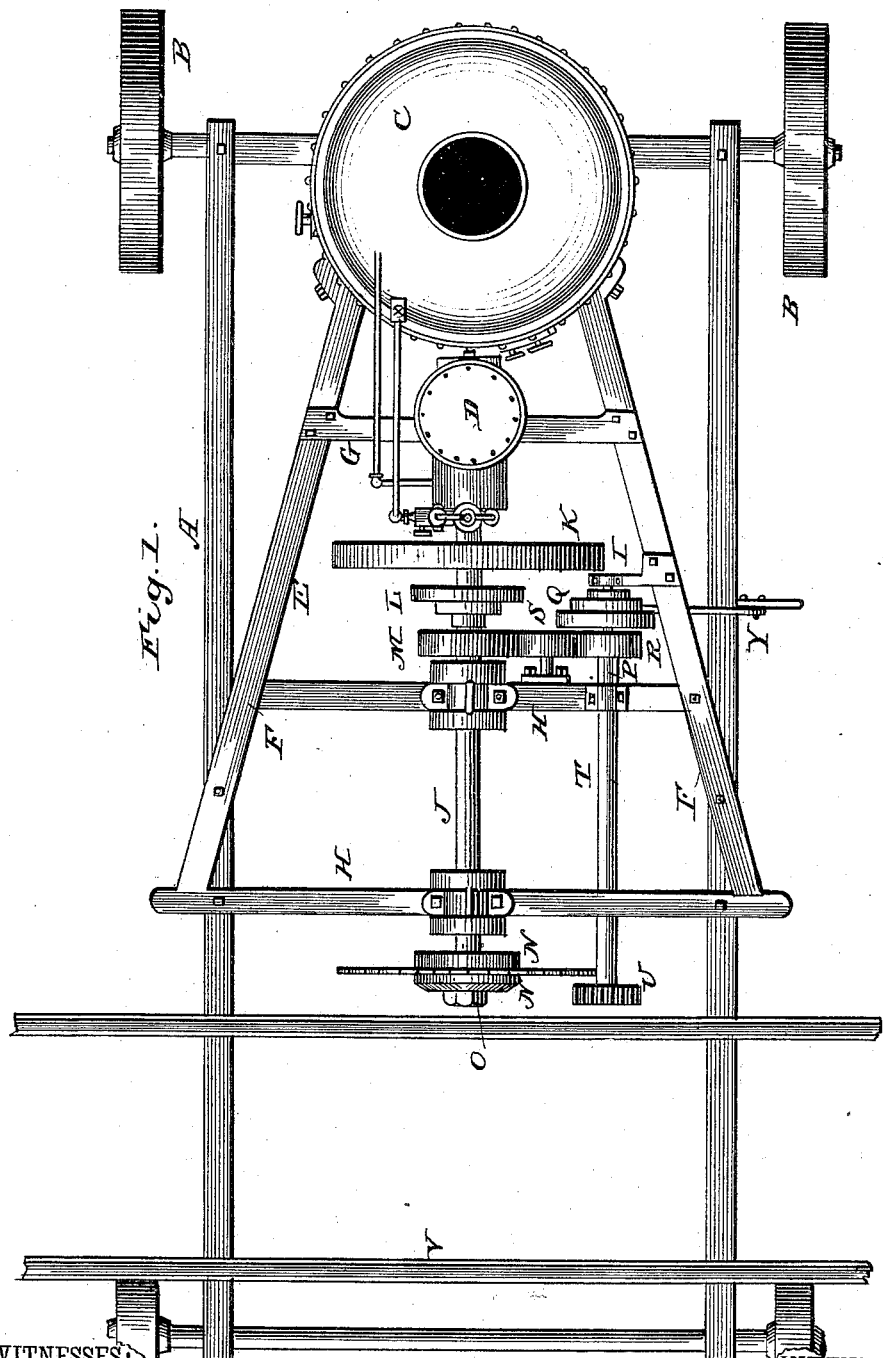

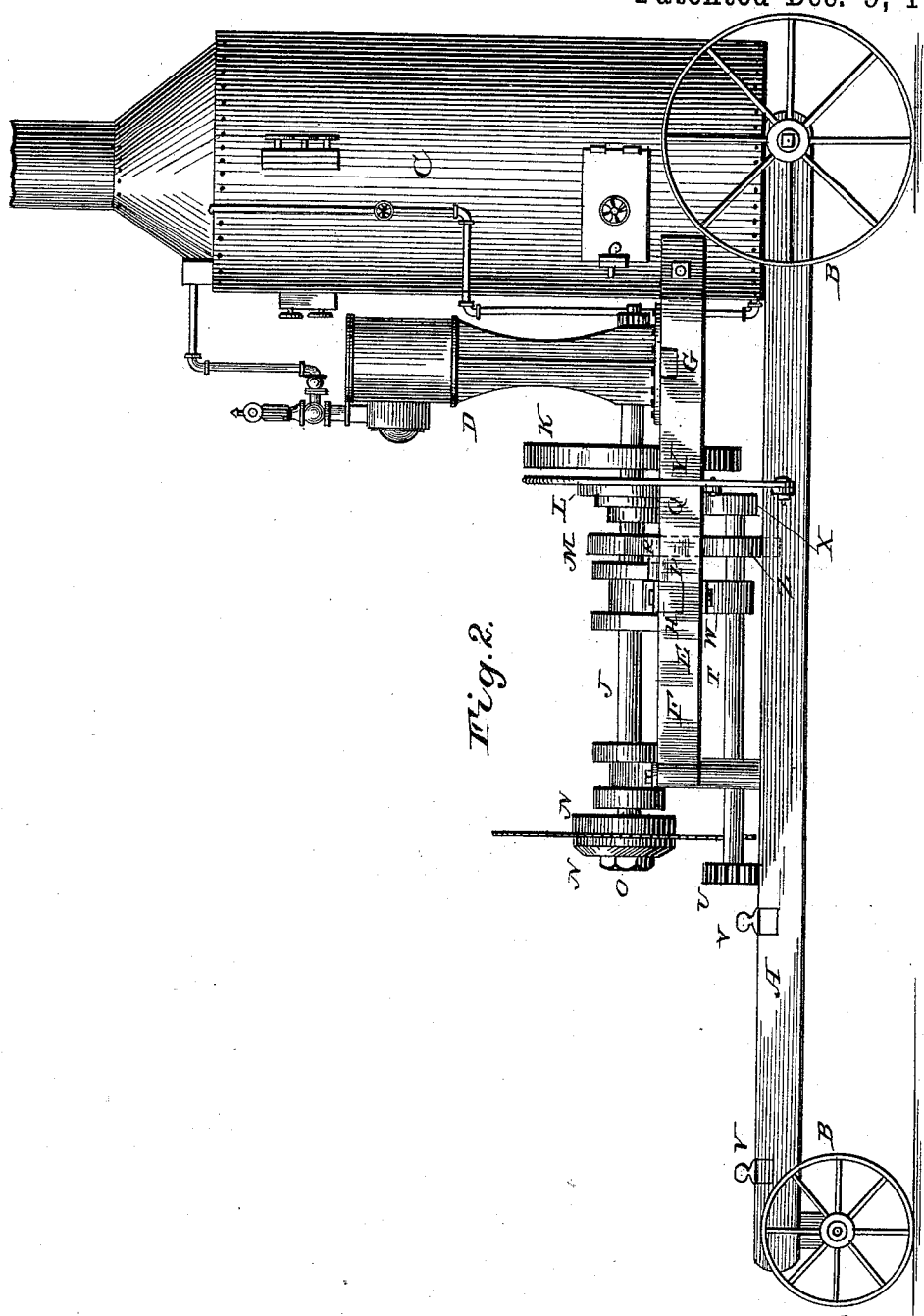

(No Model.) 3 Sheets—Sheet 3.
A. J. HUBER.
PORTABLE SAW MILL.
No. 309,056. Patented Dec. 9, 1884.
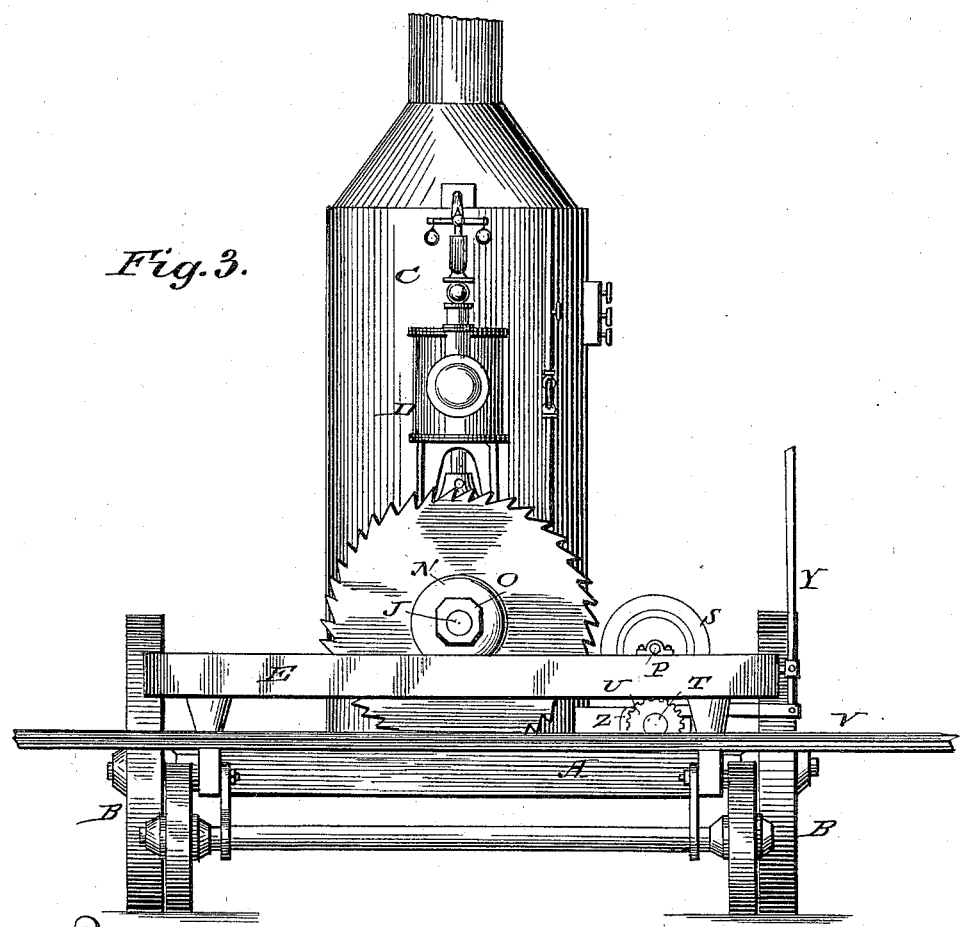
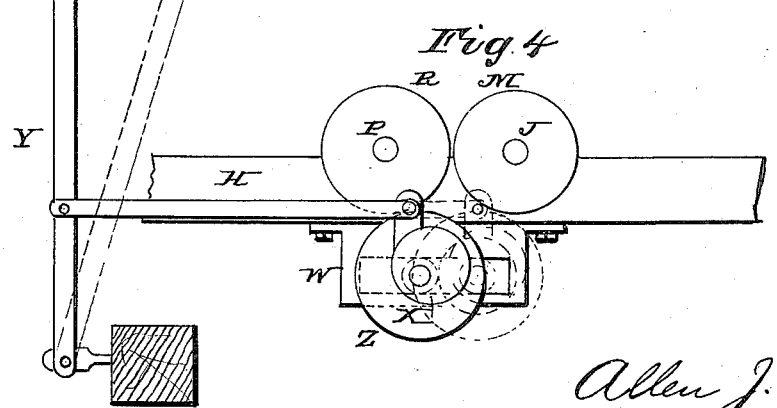
WITNESSES:
Fred. G. Dieterich
Wm. Bagger
Allen J. Huber,
INVENTOR;
by: Louis Bagger & Co.
ATTORNEYS.

UNITED STATES PATENT OFFICE.

ALLEN J. HUBER, OF COLUMBUS GROVE, OHIO.

PORTABLE SAW-MILL.

SPECIFICATION forming part of Letters Patent No. 309,056, dated December 9, 1884.

Application filed August 29, 1884. (No model.)

*To all whom it may concern:*

Be it known that I, A. J. HUBER, a citizen of the United States, and a resident of Columbus Grove, in the county of Putnam and State of Ohio, have invented certain new and useful Improvements in Portable Saw-Mills; and I do hereby declare that the following is a full, clear, and exact description thereof, which will enable others skilled in the art to which it appertains to make and use the same, reference being had to the accompanying drawings, which form a part of this specification, and in which—

Figure 1 is a plan view of my improved portable saw-mill, the wheels of the truck having been removed. Fig. 2 is a side view of the machine. Fig. 3 is an end view, and Fig. 4 is a detail view showing the mechanism for reversing the revolutions of the carriage-operating shaft.

The same letters refer to the same parts in all the figures.

This invention relates to portable saw-mills for sawing logs, fire-wood, and the like; and it has for its object to produce a machine which shall be simple in construction, durable, and which may be easily and conveniently transported from place to place and set up for operation without loss of time.

With these ends in view the invention consists in the improved construction and combination of parts which will be hereinafter fully described, and particularly pointed out in the claim.

In the drawings hereto annexed, A designates a rectangular frame or truck, mounted upon wheels B B, in order that it may be conveniently moved or transported from place to place. The rear end of the frame or truck A supports an upright boiler, C, serving to generate the steam-supply for a vertical engine, D, of suitable construction, mounted in front of the said boiler, and supplying the motive power for the saw-mill, as will be presently described.

E is a frame mounted or supported upon the truck A, and consisting, mainly, of a pair of forwardly-diverging beams, F F, the rear ends of which are suitably bolted to the boiler, which is thereby braced in its proper position. The said frame has a cross-piece, G, supporting the engine, and additional cross-pieces H H and brackets I, which afford bearings for the several shafts of the machine.

J designates the main shaft, which receives its motion direct from the engine, and which is provided near its rear end with the balance-wheel K. The main shaft is provided in front of the balance-wheel with a cone-pulley, L, and in front of the latter with a friction-wheel, M, which is to be made of iron. The front end of the main shaft J carries the saw-collars N N and the clamping-nut O, by means of which the saw is mounted securely upon the said shaft or arbor.

P is a shaft arranged parallel to the main shaft J, and having a cone-pulley, Q, connected by a suitable belt or band with the cone-pulley L upon the main shaft. The said shaft P also carries a friction-pulley, R, which is in contact with and receives motion from an intermediate friction-pulley, S, arranged between the pulley R and the friction-wheel M.

T is a shaft arranged underneath the shaft P, and having at its front end the feed-pinion U, which engages the rack of the log-carriage (not shown in the drawings,) which moves in the usual manner upon the tracks V V. The rear end of the shaft T is arranged in a bearing, W, which has a slightly sliding motion, and which, by means of an eccentric, X, operated by a suitable hand-lever, Y, may be moved so as to cause a friction-wheel, Z, upon the rear end of the shaft T to engage either one of the friction-pulleys R or M, thereby causing the shaft T and the carriage operated thereby to be moved in either direction.

From the foregoing description, taken in connection with the drawings hereto annexed, the operation and advantages of this invention will be readily understood.

The construction of my improved portable saw-mill is exceedingly simple, as well as light and durable, thus enabling it to be constructed at a moderate expense, and rendering it particularly serviceable for the purposes intended.

I am aware that it is not broadly new to have a friction-pulley upon the shaft which operates the gig or feeding mechanism in a saw-mill, which friction-pulley may be brought to engage friction-pulleys connected to and revolved from the saw-arbor, and revolving in opposite directions, and I do not claim such construction, broadly; but

I claim—

In a portable saw-mill, the combination of a rectangular truck or frame mounted upon suitable transporting-wheels, an upright boiler mounted upon the rear end of the said frame, a frame mounted upon the said truck, and consisting, mainly, of side beams or sills diverging in a forward direction, having their rear ends bolted to the boiler and connected by suitable cross-braces, and the upright engine and saw-mill gear mounted upon the said upper frame, substantially as and for the purpose set forth.

In testimony that I claim the foregoing as my own I have hereunto affixed my signature in presence of two witnesses.

ALLEN J. HUBER.

Witnesses:
J. F. BOGART,
W. BLAZE.